US011170010B2

(12) United States Patent
Ackermann et al.

(10) Patent No.: US 11,170,010 B2
(45) Date of Patent: Nov. 9, 2021

(54) METHODS AND SYSTEMS FOR ITERATIVE ALIAS EXTRACTION

(71) Applicant: INTERNATIONAL BUSINESS MACHINES CORPORATION, Armonk, NY (US)

(72) Inventors: Christopher Ackermann, Fairfax, VA (US); Charles Beller, Baltimore, MD (US); Edward Katz, Herndon, VA (US); Michael Drzewucki, Woodbridge, VA (US); Kristen Summers, Takoma Park, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 16/432,480

(22) Filed: Jun. 5, 2019

(65) Prior Publication Data

US 2020/0387506 A1 Dec. 10, 2020

(51) Int. Cl.
*G06F 16/24* (2019.01)
*G06F 16/2458* (2019.01)
*G06F 16/28* (2019.01)
*G06F 16/93* (2019.01)
*G06F 16/242* (2019.01)
*G06F 40/00* (2020.01)

(52) U.S. Cl.
CPC ........ *G06F 16/2458* (2019.01); *G06F 16/243* (2019.01); *G06F 16/288* (2019.01); *G06F 16/93* (2019.01); *G06F 40/00* (2020.01)

(58) Field of Classification Search
None
See application file for complete search history.

(56) References Cited

U.S. PATENT DOCUMENTS

| | | | |
|---|---|---|---|
| 7,627,569 B2 * | 12/2009 | Gafter | G06F 21/6209 |
| 8,538,984 B1 | 9/2013 | Abhijit et al. | |
| 8,886,750 B1 * | 11/2014 | Mutz | G06F 15/16 |
| 9,870,423 B1 | 1/2018 | Bousquet et al. | |
| 2004/0267721 A1 | 12/2004 | Meyerzon et al. | |
| 2005/0044037 A1 * | 2/2005 | Lawrence | G06F 16/24 |
| | | | 707/999.003 |
| 2008/0215562 A1 * | 9/2008 | Biesenbach | G06F 16/3337 |
| 2015/0039579 A1 * | 2/2015 | Clark | G06F 16/3338 |
| | | | 707/706 |
| 2015/0379133 A1 * | 12/2015 | Basovnik | G06F 16/2358 |
| | | | 707/711 |
| 2016/0140237 A1 | 5/2016 | Musgrove | |

* cited by examiner

*Primary Examiner* — Son T Hoang
(74) *Attorney, Agent, or Firm* — Griffiths & Seaton PLLC

(57) ABSTRACT

Identifying alternative names of entities includes receiving a query associated with a name of an entity and a corpus. References to the name of the entity within the corpus are identified. The references to the name of the entity within the corpus are analyzed to determine at least one first alternative name of the entity. References to the determined at least one first alternative name of the entity within the corpus are identified. The references to the determined at least one first alternative name of the entity within the corpus are analyzed to determine at least one second alternative name of the entity.

18 Claims, 6 Drawing Sheets

METHODS AND SYSTEMS FOR ITERATIVE ALIAS EXTRACTION

STATEMENT REGARDING FEDERALLY SPONSORED RESEARCH OR DEVELOPMENT

This invention was made with United States Government support under Contract No.: 2018-1801080001. The Government has certain rights in this invention.

BACKGROUND OF THE INVENTION

Field of the Invention

The present invention relates in general to computing systems, and more particularly, to various embodiments for identifying alternative names for entities and/or utilizing such for performing searches.

Description of the Related Art

Computing systems (and/or search algorithms) are often used to search various corpora (one or more corpus), such a one or more documents, spreadsheets, etc., for references to (or mentions of) names (or other identifying terms) of entities (e.g., individuals/people, organizations, objects, places, etc.). In order for the system to work effectively, it is generally accepted that is ideal for the system to be able to handle (or detect) variants of (or variations in) the names. For example, if a user provides a query (or search request) for the name of a particular individual, the search may be considered to be incomplete if the system does not identify both the name exactly how it was entered along with variations of the name (e.g., variations of the first/given name, inclusion of a middle name and/or name suffix, etc.).

One approach of handling such searches is to expand the query to include likely name variants. Name expansion strategies have been implemented that rely on a structured database of name variants. However, creating and maintaining such a resource is time consuming and expensive. Additionally, such an approach typically only works well for coarse and general name expansion, such as common variants in first/given names, but not nicknames. Furthermore, the precision of the search may suffer as the system may identify references that do not apply to the target or intended entity.

SUMMARY OF THE INVENTION

Various embodiments for identifying alternative names of entities, by a processor, are provided. A query associated with a name of an entity and a corpus is received. References to the name of the entity within the corpus are identified. The references to the name of the entity within the corpus are analyzed to determine at least one first alternative name of the entity. References to the determined at least one first alternative name of the entity within the corpus are identified. The references to the determined at least one first alternative name of the entity within the corpus are analyzed to determine at least one second alternative name of the entity.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
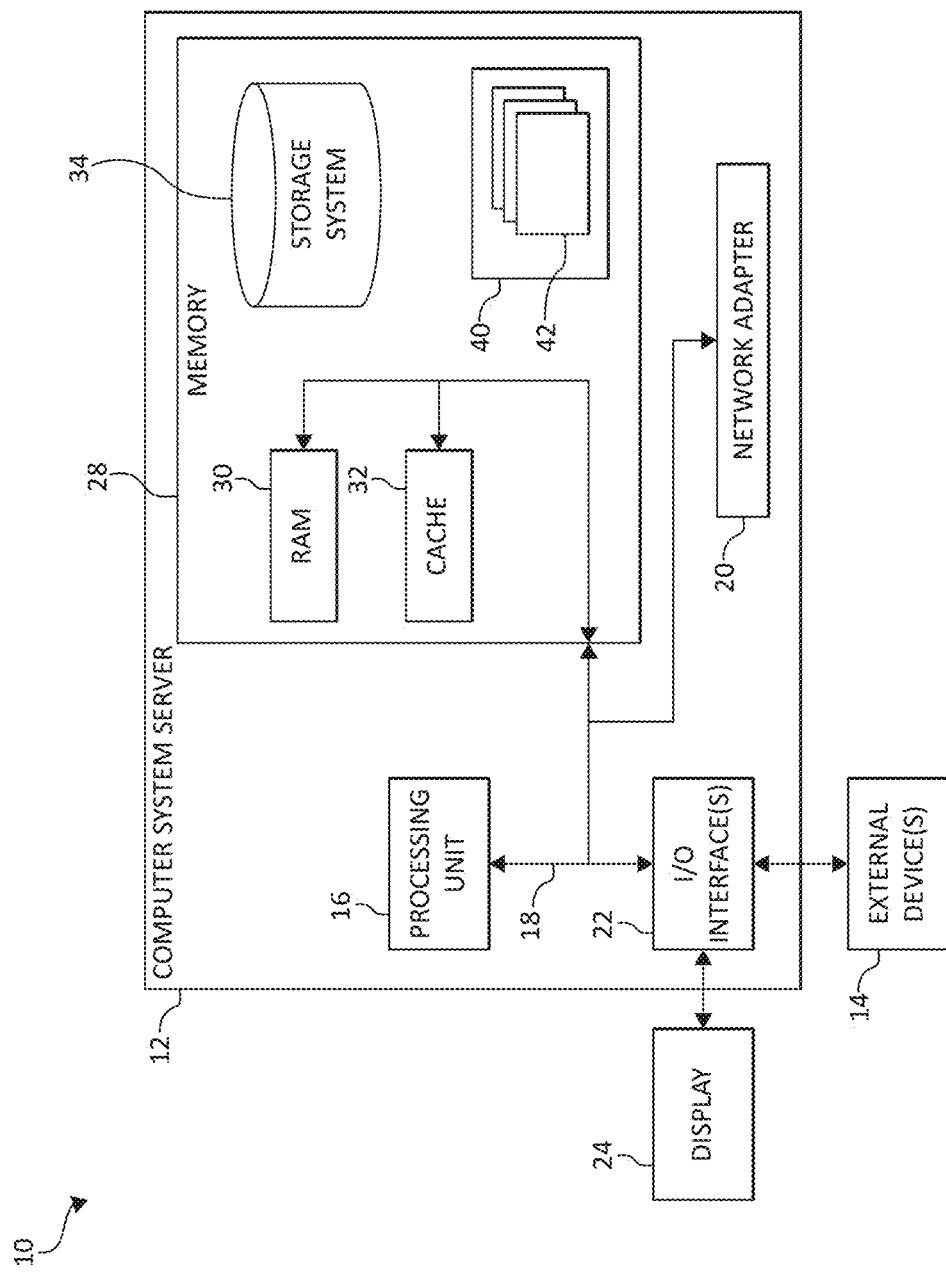
FIG. 1 is a block diagram depicting an exemplary computing node according to an embodiment of the present invention.

As discussed above, computing systems (and/or search algorithms) are often used to search various corpora (one or more corpus), such a one or more documents, spreadsheets, etc., for references to (or mentions of) names (or other identifying terms) of entities (e.g., individuals/people, organizations, objects, places, etc.). In order for the system to work effectively, it is generally accepted that is ideal for the system to be able to handle (or detect) variants of (or variations in) the names. For example, if a user provides a query (or search request) for the name of a particular individual, the search may be considered to be incomplete if the system does not identify both the name exactly how it was entered along with variations of the name (e.g., variations of the first/given name, inclusion of a middle name and/or name suffix, etc.).

One approach of handling such searches is to expand the query to include likely name variants. Name expansion strategies have been implemented that rely on a structured database of name variants. However, creating and maintaining such a resource is time consuming and expensive. Additionally, such an approach typically only works well for coarse and general name expansion, such as common variants in first/given names, but not nicknames. Furthermore, the precision of the search may suffer as the system may identify references that do not apply to the target or intended entity.

For example, consider a scenario in which a user provides a query for "Will Smith." Conventional approaches may allow the system to identify "Willard Smith" and "Willard Carroll Smith II," along with "Will Smith," as references to the target identity (i.e., assuming those alternative names are included in the database that is utilized).

However, the system may not be able to identify "The Fresh Prince" as an alternative name for the target identity, even if the term "The Fresh Prince" is included in the corpus in such a way that indicates that it is sometimes used to refer to the target entity. That is, in some instances, the documents being searched include information about alternative names for entities. Generally, conventional approaches are unable to identify and utilize such information to perform searches.

To address these needs and/or the shortcomings in the prior art, in some embodiments described herein, methods and/or systems are disclosed that provide for improved recall (or identification or searching) of entities (or entity names) by means of a targeted, unsupervised alternative name (e.g., alias) extraction procedure to iteratively expand results. For example, in some embodiments, the methods and/or systems utilize references to alternative names (e.g., or aliases, especially in cases in which the entities are individuals) within the searched corpus (or corpora) to iteratively build upon the identified references to the target entity.

In some embodiments, a user initially queries a retrieval system (or search module) using a query name (or enters a name of an entity or target/intended entity to be searched for). Mentions of (or references to) that name (perhaps accounting for typographical and/or spelling errors) are retrieved from (or identified within) the corpus. The references are analyzed to determine if the references (and/or the document(s) containing the references) include occurrences of, for example, lexico-syntactic alias patterns that indicate alternative names are provided in (or "near") the references. If the system determines that one or more alternative name for the entity is indicated by the references, the alternative names are added to the query. This process may be repeated multiple times such that the query (or search) is iteratively expanded (i.e., by adding more and more alternative names to the search). The result is a significantly higher recall in discovering mentions of the target entity. The precision of the search may remain relatively high, as the alternative names are explicitly associated with the target entity.

More particularly, in some embodiments, a user (e.g., an individual or computing system) first submits a query which specifies the name of an entity. The system then searches the corpus (i.e., the one or more documents, etc. being searched) for (one of more) mentions of or references to entities that match the specified name returning a preliminary result (or set of preliminary results). The identified references to the entity are then analyzed (e.g., via keywords, some other Natural Language Processing (NLP) technique, etc.) to detect the presence of, for example, lexico-syntactic alias patterns that indicate one or more alternative name (i.e., one or more first alternative name) is provided by the references. The (first) alternative name(s) is extracted and added to the query (i.e., if any alternative names are identified).

The corpus is then searched again for references to both the initial entity name and the (first) alternative name(s). The identified references are then analyzed in a manner similar to that described above, which may result in the identification of additional alternative names (i.e., one or more second alternative name). The new (or second) alternative name(s) is then added to the query, and the process is repeated. In some embodiments, the process is repeated until no additional alternative names (i.e., third, fourth, etc. alternative names) are identified or discovered within the corpus. The results of the search may then be provided to the user. For example, a list of alternative names (e.g., the discovered first, second, etc. alternative names) for the entity, a list of documents that include the alternative names, and/or portions/excerpts/passages of the documents that include the references may be provided to the user (e.g., via an electronic communication, pop-up window, etc.).

The methods and/or systems described herein may improve recall (or searching) relatively quickly with a relatively low cost to precision ratio. Additionally, the methods/systems do not rely on large resources of existing entity alternative names, which may be difficult to maintain and may grow out of sync with a corpus. Rather, any alternative name used in an identified or retrieved passage may be used to expand the result set. Further, the methods/systems described herein do not rely on internet-based constructs or high-volume information, making it applicable to organizations' internal databases, individuals who are not famous, etc.

In some embodiments, the corpus is searched for the entity name(s) (e.g., the initial entity name and/or any discovered alternative names) using any suitable search algorithm, such as a string-searching algorithm, as is commonly understood. Additionally, embodiments described herein may utilize any suitable solution to account for typographical and spelling errors in (and/or alternative spellings of) entity names provided by users (and/or discovered alternative names), such as string metrics and string matching, as is commonly understood.

In some embodiments, identified references (i.e., to the initial entity name and/or any discovered alternative names) are analyzed to determine whether or not the references include, for example, a lexico-syntactic alias pattern. That is, the references are analyzed to determine whether or not the references include and/or indicate an alternative name of the entity. For example, the system may detect such if a reference includes particular keywords, key phrases, or key terms, such as "a.k.a.," "aka," "also known as," etc. In some embodiments, such a process (and/or any process described herein) may be performed utilizing a cognitive analysis.

The cognitive analysis may include classifying natural language, analyzing tone, and analyzing sentiment (e.g., scanning for keywords, key phrases, etc.) with respect to, for example, content and communications sent to and/or received by users, and/or other available data sources. In some embodiments, natural language processing (NLP), Mel-frequency cepstral coefficients (MFCCs) (e.g., for audio content), and/or region-based convolutional neural network (R-CNN) pixel mapping (e.g., for images/videos), as are commonly understood, are used. As such, it should be understood that the methods/systems described herein may be applied to content other than text-based (or alphanumeric) content but also audio content and/or images/videos (e.g., an alternative name is referenced in an audio and/or video file).

The processes described herein may utilize various information or data sources associated with users (e.g., users who provide search queries) and/or the content (e.g., the document(s), file(s), etc. within the corpus). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, determine or specify the user's intended target entity.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the searching for, discovering, and/or identifying alternative entity names (and/or documents that include such), as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that the embodiments described herein may be applied to the names (or other identifying terms) of any type of entity. That is, although some embodiments described herein are described with respect to alternative names, or aliases, of individuals (e.g., given/family names, nicknames, etc.), the methods/systems described herein may be applied to the names (or alternative names) of any type of entity, such as organizations, objects, places, etc.

It should also be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for identifying alternative names of entities, by a processor, are provided. A query associated with a name of an entity and a corpus is received. References to the name of the entity within the corpus are identified. The references to the name of the entity within the corpus are analyzed to determine at least one first alternative name of the entity. References to the determined at least one first alternative name of the entity within the corpus are identified. The references to the determined at least one first alternative name of the entity within the corpus are analyzed to determine at least one second alternative name of the entity.

A list that includes the determined at least one first alternative name of the entity, the determined at least one second alternative name of the entity, or a combination thereof may be generated. References to the determined at least one second alternative name of the entity within the corpus may be identified.

The analyzing of the references may be performed utilizing a natural language processing technique. The entity may be an individual. The determined at least one first alternative name of the entity and the determined at least one second alternative name of the entity may be aliases of the individual.

The corpus may include a plurality of documents. A list of those of the plurality of documents that include at least one reference to at least one of the name of the entity, the determined at least one first alternative name of the entity, and the determined at least one second alternative name of the entity may be generated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
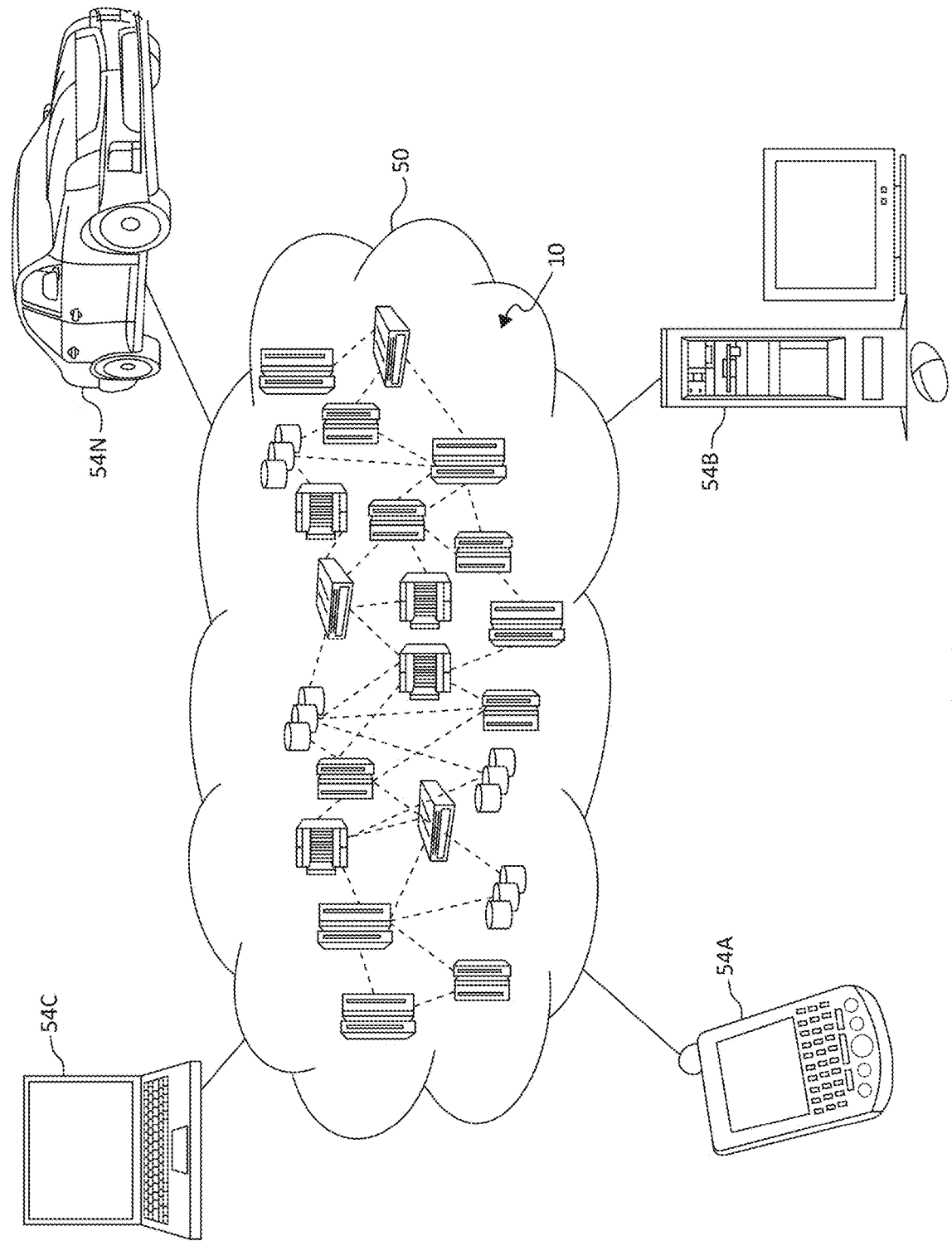
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
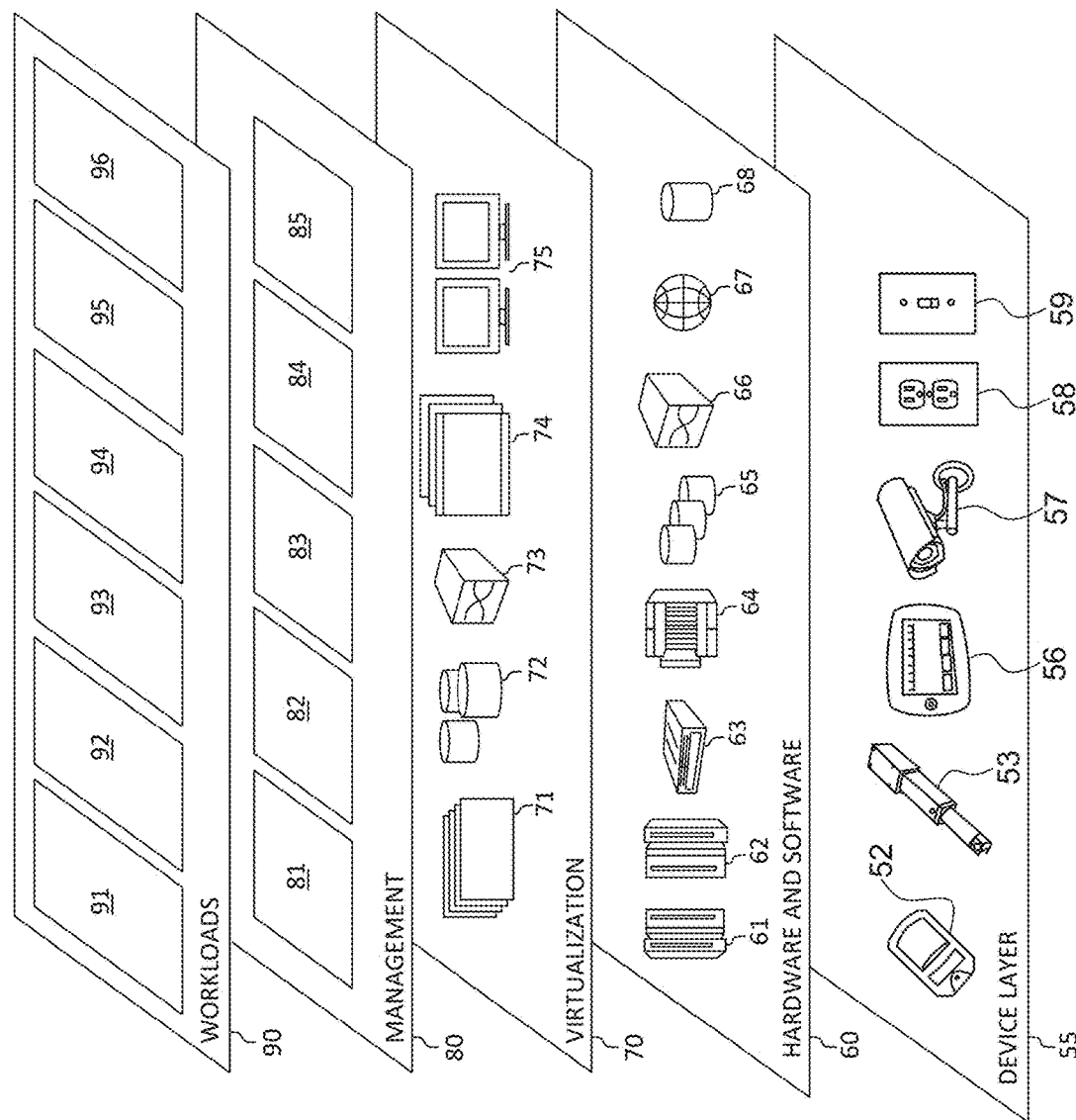
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for identifying alternative names of entities, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for identifying alternative names for entities are provided. In some embodiments, a user initially queries a retrieval system using a query name (or enters a name of an entity or target/intended entity to be searched for). Mentions of (or references to) that name (perhaps accounting for typographical and/or spelling errors) are retrieved from (or identified within) the corpus. The references are analyzed to determine if the references (and/or the document(s) containing the references) include occurrences of lexico-syntactic alias patterns that indicate alternative names are provided in (or "near") the references. If the system determines that one or more alternative names for the entity are indicated by the references, the alternative names are added to the query. This process may be repeated multiple times such that the query (or search) is iteratively expanded (i.e., by adding more and more alternative names to the search). The process may cease when no additional alternative names are discovered or identified.

The results of the search may then be provided to the user. For example, a list of alternative names (e.g., the discovered first, second, etc. alternative names) for the entity, a list of documents that include the alternative names, and/or portions/excerpts/passages of the documents that include the references may be provided to the user (e.g., via an electronic communication, pop-up window, etc.).

Figure 4:
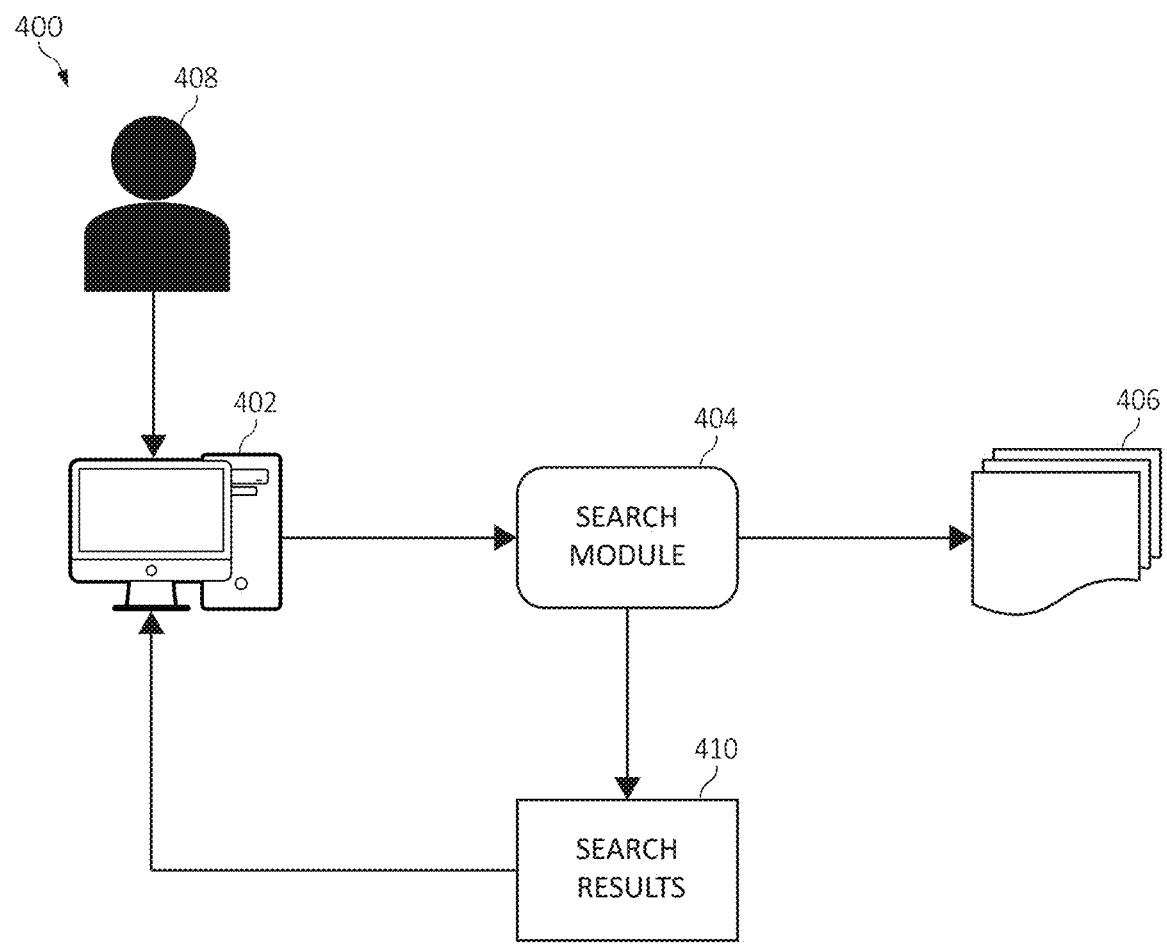
FIG. 4 is a block diagram a computing environment according to an embodiment of the present invention.

FIG. 4 illustrates an exemplary computing environment 400 according to some embodiments of the present invention. In the depicted environment, the computing environment 400 includes a computing device 402, a search module 404, and a corpus 406.

The computing device (or node) 402 may be any suitable computing device, such as those described above (e.g., a desktop PC, a mobile electronic device, etc.), which may be utilized by a user (or individual) 408 to, for example, initiate a search of the corpus. However, it should be understood that the methods described herein may be initiated by a computing device (or system) (e.g., automatically initiated in response to previous events, based on a schedule, etc.).

The search module 404 may include (and/or be implemented with) any suitable computing device or system, such as those described above, and may be configured to perform the searching of corpora and/or any associated processes (e.g., a cognitive analysis) and return search results 410 to the user 408 (e.g., via the computing device 402), as described above. The corpus 406 may include one or more of any type of suitable document, file, database, etc., such as unstructured documents, websites, word processing documents, spreadsheets, electronic communications (e.g., emails, text messages, etc.), audio/video files, etc., that may be accessed and/or is/are searchable by the computing device 402 and/or the search module 404. In some embodiments, the computing device 402, the search module 404, and/or the corpus 406 may be integrated into common computing devices and/or located locally. For example, the search module 404 may be integrated within the computing device 402. However, in some embodiments, the components shown in FIG. 4 may be remote from each other and in operable communication via any suitable communication network (e.g., the Internet).

Figure 5:
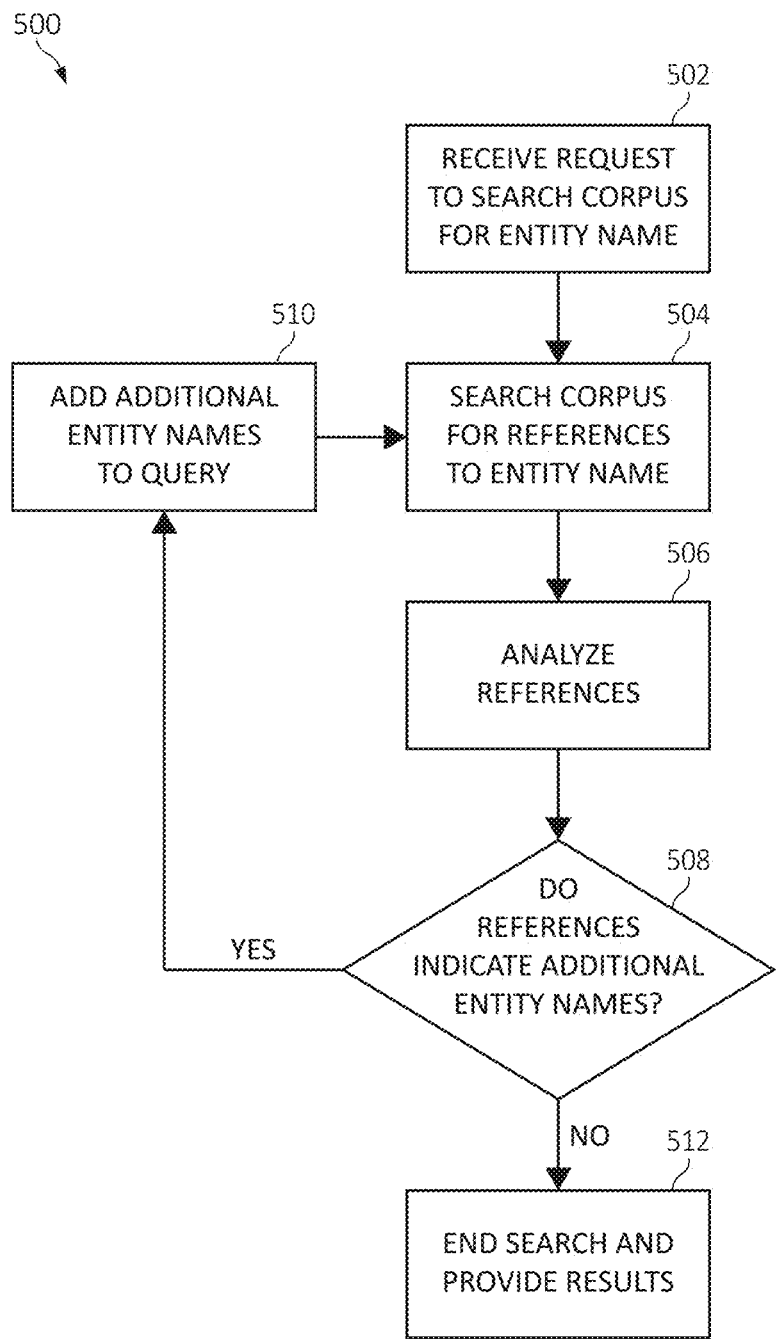
FIG. 5 is a flowchart diagram of a method that may be implemented within the computing environment of FIG. 4 according to an embodiment of the present invention.

FIG. 5 depicts a flow chart of one example of functionality (or a method) 500 that may be performed within the environment 400 shown in FIG. 4, according to some embodiments described herein. As shown in FIG. 5, the method 500 begins at block 502 with a request to search the corpus 406 for an entity name (and/or to identify alternative names for the entity, collect a list of the document(s) within the corpus 406 that include the initial name and/or any alternative names of the entity, etc.) being received. As described above, the request may be provided by the user 408 (FIG. 4) via the computing device 402.

At block 504, the corpus is searched (e.g., by the search module 404) for references (i.e., one or more reference) to the entity name as specified by the request (i.e., the initial query or initial entity name) using any suitable method. For example, any mentions of the entity (or entity name) within the corpus may be identified and/or retrieved along with, for example, portions of the respective document in which the mentions occur (e.g., the entire sentence, paragraph, etc.).

The references (or mentions) are then analyzed to identify (or extract) alternative names (i.e., first, second, third, etc. alternative names) for the entity at block 506. As described above, this may be performed using a NLP technique and/or keyword search. For example, the sentences may be parsed for occurrences of alias key terms, such as "aka" or "also known as." However, it should be understood that various sorts of text or symbols may be utilized as being indicative of alternative names, which may be a configurable setting within the system). As other examples, the presence of a name or other identifying term/phrase after (or near) the instance of the initial entity name, which appears within parenthesis (and/or quotation marks) and/or is separated by a "slash" may be considered to be indicative of an alternative name. As a specific example, consider an initial query for "Will Smith," and identified mentions of "Will Smith" within the corpus appear as "Will Smith (Willard Carroll Smith II)" or "Will Smith/Willard Carroll Smith II." In such instances, "Willard Carroll Smith II" may be determined to be an alternative name for the entity.

At block 508, the determined (or identified) alternative name(s) for the entity are compared to the names for which the previous search was performed (e.g., the initial entity name). If any of alternative names are determined to be "new" or "additional" (i.e., they were not explicitly queried previously), at block 510, the new/additional alternative names are added to the query, and another search is performed at block 504. That is, a search is performed for both the initial entity name and the discovered alternative names.

As shown in FIG. 5, this process is repeated (or performed iteratively) until no new/additional alternative names are discovered within the corpus. More specifically, at block 508, if the references identified by the most recent search do not indicate any new/additional alternative names, the search ends and the results are provided (e.g., to the user) at block 512. For example, a list of all discovered alternative names for the entity, the documents in which the alternative names were found, and/or the appropriate excerpts of the documents, etc. may be provided to the user, perhaps along with similar results associated with the initial entity name/search query. It should be noted that, in at least some embodiments, if no alternative names are identified/discovered during the initial/first search, no additional searches may be performed (i.e., the results provided may indicate that no alternative names for the entity were discovered).

In some embodiments, when the results are provided to the user, the user may be able to provide an indication (e.g., via any suitable user input device) of the alternative names within the results that do not match their intended target entity (if any). The system may then utilize the user input to provide a new set of results, which excludes any alternative names that are associated with the user's input. Such user input may be utilized as feedback to improve the performance of the system over time (i.e., at least to an extent that would not undesirably limits results in later searches).

In some embodiments, limits are imposed to ensure rapid searching and prevent "overexpansion" through indirect relationships. For example, consider a scenario in which a reference such as "John Doe, a.k.a Shorty" results in a reference of "Charles Brown, a.k.a. Shorty" being identified. That is, two distinct individuals share a common nickname. To prevent such, the imposed limit may include a maximum number of repetitions and/or the returned alternative names may be filtered based on rules associated with the alias key terms and existing selected aliases. For example, the terms "aka," "a.k.a.," and "alias" may be limited so that when used with common nickname patterns (e.g., a single word or "the" plus a single word), the other side of the pattern (or term/phrase that indicates an alternative name and/or alias term) is included only if it does not conflict with a fuller name from an earlier iteration or the original query, while the alias key term "full name" may be limited to produce names longer than the query name with significant similarity to it. Thus, for a query for "John Doe," a document containing "John Doe a.k.a. Shorty" would add the alternative name (or alias) "Shorty," but "Charles Brown a.k.a. Shorty" in a subsequent query iteration would not add "Charles Brown."

Figure 6:
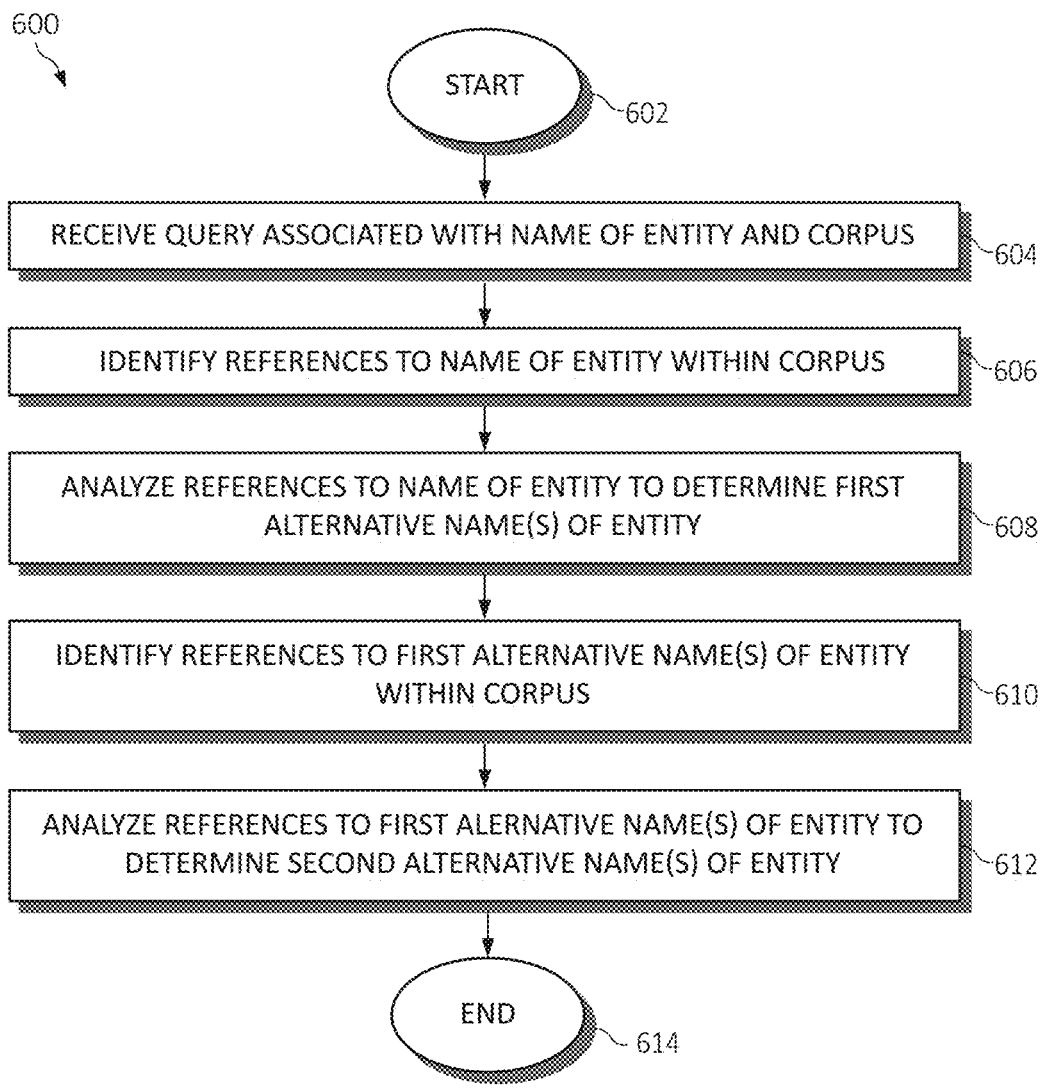
FIG. 6 is a flowchart diagram of an exemplary method for identifying alternative names of an entity according to an embodiment of the present invention.

Turning to FIG. 6, a flowchart diagram of an exemplary method 600 for identifying (and/or searching for) alternative names of entities is provided. The method 600 begins (step 602) with, for example, a corpus (e.g., one or more documents) being made accessible by a computing device/system and/or search module, as described above.

A query associated with a name of an entity and a corpus is received (step 604). That is, a query (or request) to search for the name of an entity (and/or identify alternative names for the entity) within (or utilizing) a corpus is received. The entity may be an individual. However, in some embodiments, the entity may be, for example, an object, place, organization, etc. The query may be provided by a user (e.g., an individual or computing system) via any suitable computing device.

References to the name of the entity within the corpus are identified (step 606). That is, the corpus may be searched for the entity name as specified in the received query (or the initial entity name), and the references/mentions of the entity name may be tagged or retrieved from the corpus.

The references to the name of the entity within the corpus are analyzed to determine at least one first alternative name of the entity (step 608). In some embodiments, identified references are analyzed to determine whether or not the references include, for example, a lexico-syntactic alias pattern. That is, the references are analyzed to determine whether or not the references include and/or make reference to an alternative name of the entity. For example, the system may detect such if a reference includes particular keywords, key phrases, or key terms, such as "a.k.a.," "aka," "also known as," etc. The analyzing of the references (and/or any process described herein) may be performed utilizing a cognitive analysis and/or NLP technique. The first alternative name(s) of the entity may be an alias (e.g., when the entity is an individual).

References to the determined at least one first alternative name of the entity within the corpus are identified (step 610). That is, the corpus may be searched for references to the first alternative name(s) of the entity (perhaps along with initial entity name), and again, the references/mentions of the entity name(s) may be tagged or retrieved from the corpus.

The references to the determined at least one first alternative name of the entity within the corpus are analyzed to determine at least one second alternative name of the entity (step 612). That is, the references to the first alternative name(s) of the entity may be analyzed in a manner similar to the references to the initial entity name to determine additional (second) alternative names of the entity (if any).

Although not shown in FIG. 6, this process may be repeated until the search does not discover any new/additional alternative names for the entity. That is, the process may be iteratively repeated until all possible alternative names of the entity within the corpus have been identified.

Method 600 ends (step 614) with, for example, the results of the search being provided to the user. For example, a list that includes the determined (i.e., the first, second, third, etc.) alternative names of the entity, perhaps along with the initial entity name, and/or a list of those of the plurality of documents within the corpus that include at least one reference to at least one of name of the entity (i.e., the initial entity name and/or any of the alternative names of the entity) may be generated. In some embodiments, feedback from users (e.g., early adopters and/or later uses) may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for identifying alternative names of entities, by a processor, comprising:
   receiving a query associated with a name of an entity and a corpus, wherein the entity is an individual;
   identifying references to the name of the entity within the corpus;
   analyzing the references to the name of the entity within the corpus to obtain at least one first alternative name of the entity within the corpus;
   subsequent to obtaining the at least one first alternative name of the entity, automatically generating a second query having the name of the entity and the obtained at least one first alternative name of the entity;
   searching, using the generated second query, to identify references to the obtained at least one first alternative name of the entity within the corpus;
   analyzing the references to the obtained at least one first alternative name of the entity within the corpus to obtain at least one second alternative name of the entity within the corpus;
   subsequent to obtaining the at least one second alternative name of the entity, automatically generating a third query having the name of the entity, the obtained first alternative name of the entity, and the obtained second alternative name of the entity;
   searching, using the generated third query, the corpus to identify and analyze whether additional references exist in the corpus to obtain any additional alternative names of the entity within the corpus; and responsive to determining that the additional references do not exist within the corpus, providing at least one of the obtained at least one first or second alternative name of the entity as search result of the received query.

2. The method of claim 1, further comprising generating a list that includes the obtained at least one first alternative name of the entity, the obtained at least one second alternative name of the entity, or a combination thereof.

3. The method of claim 1, wherein the analyzing steps are performed utilizing a natural language processing technique.

4. The method of claim 1, wherein the obtained at least one first alternative name of the entity and the obtained at least one second alternative name of the entity are aliases of the individual.

5. The method of claim 1, wherein the corpus includes a plurality of documents.

6. The method of claim 5, further comprising generating a list of those of the plurality of documents that include at least one reference to at least one of the name of the entity, the obtained at least one first alternative name of the entity, and the obtained at least one second alternative name of the entity.

7. A system for identifying alternative names of entities comprising:
a processor executing instructions stored in a memory device, wherein the processor:
receives a query associated with a name of an entity and a corpus, wherein the entity is an individual;
identifies references to the name of the entity within the corpus;
analyzes the references to the name of the entity within the corpus to obtain at least one first alternative name of the entity within the corpus;
subsequent to obtaining the at least one first alternative name of the entity, automatically generates a second query having the name of the entity and the obtained at least one first alternative name of the entity;
searches, using the second generated query, the corpus to identify references to the obtained at least one first alternative name of the entity within the corpus;
analyzes the references to the obtained at least one first alternative name of the entity within the corpus to obtain at least one second alternative name of the entity within the corpus;
subsequent to obtaining the at least one second alternative name of the entity, automatically generates a third query having the name of the entity, the obtained first alternative name of the entity, and the obtained second alternative name of the entity;
searches, using the generated third query, the corpus to identify and analyze whether additional references exist in the corpus to obtain any additional alternative names of the entity within the corpus; and
provides, responsive to determining that the additional references do not exist within the corpus, at least one of the obtained at least one first or second alternative name of the entity as search result of the received query.

8. The system of claim 7, wherein the processor further generates a list that includes the obtained at least one first alternative name of the entity, the obtained at least one second alternative name of the entity, or a combination thereof.

9. The system of claim 7, wherein the analyzing steps are performed utilizing a natural language processing technique.

10. The system of claim 7, wherein the obtained at least one first alternative name of the entity and the obtained at least one second alternative name of the entity are aliases of the individual.

11. The system of claim 7, wherein the corpus includes a plurality of documents.

12. The system of claim 11, wherein the processor further generates a list of those of the plurality of documents that include at least one reference to at least one of the name of the entity, the obtained at least one first alternative name of the entity, and the obtained at least one second alternative name of the entity.

13. A computer program product for identifying alternative names of entities, by a processor, the computer program product embodied on a non-transitory computer-readable storage medium having computer-readable program code portions stored therein, the computer-readable program code portions comprising:
an executable portion that receives a query associated with a name of an entity and a corpus, wherein the entity is an individual;
an executable portion that identifies references to the name of the entity within the corpus;
an executable portion that analyzes the references to the name of the entity within the corpus to obtain at least one first alternative name of the entity within the corpus;
an executable portion that, subsequent to obtaining the at least one first alternative name of the entity, automatically generates a second query having the name of the entity and the obtained at least one first alternative name of the entity;
an executable portion that searches, using the second generated query, the corpus to identify references to the obtained at least one first alternative name of the entity within the corpus;
an executable portion that analyzes the references to the obtained at least one first alternative name of the entity within the corpus to obtain at least one second alternative name of the entity within the corpus;
an executable portion that, subsequent to obtaining the at least one second alternative name of the entity, automatically generates a third query having the name of the entity, the obtained first alternative name of the entity, and the obtained second alternative name of the entity;
an executable portion that searches, using the generated third query, the corpus to identify and analyze whether additional references exist in the corpus to obtain any additional alternative names of the entity within the corpus; and
an executable portion that, responsive to determining that the additional references do not exist within the corpus, provides at least one of the obtained at least one first or second alternative name of the entity as search result of the received query.

14. The computer program product of claim 13, wherein the computer-readable program code portions further include an executable portion that generates a list that includes the obtained at least one first alternative name of the entity, the obtained at least one second alternative name of the entity, or a combination thereof.

15. The computer program product of claim 13, wherein the analyzing steps are performed utilizing a natural language processing technique.

16. The computer program product of claim 13, wherein the obtained at least one first alternative name of the entity and the obtained at least one second alternative name of the entity are aliases of the individual.

17. The computer program product of claim 13, wherein the corpus includes a plurality of documents.

18. The computer program product of claim 17, wherein the computer-readable program code portions further include an executable portion that generates a list of those of the plurality of documents that include at least one reference to at least one of the name of the entity, the obtained at least one first alternative name of the entity, and the obtained at least one second alternative name of the entity.

* * * * *